Figure 1:
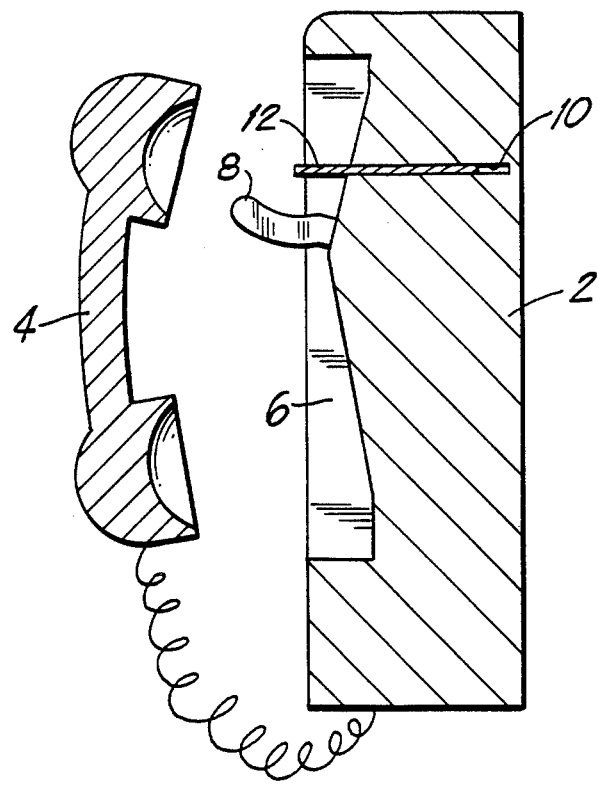

United States Patent [19]

Deaville

[11] Patent Number: 4,945,558
[45] Date of Patent: Jul. 31, 1990

[54] TELEPHONE SET

[75] Inventor: David C. Deaville, West Chester, Pa.

[73] Assignee: Mars Incorporated, McLean, Va.

[21] Appl. No.: 259,887

[22] Filed: Oct. 19, 1988

[30] Foreign Application Priority Data

Oct. 19, 1987 [GB] United Kingdom ............... 8724454

[51] Int. Cl.⁵ .......................................... H04M 17/02
[52] U.S. Cl. ..................................... 379/144; 235/482
[58] Field of Search ................ 379/91, 144, 455, 457,
379/357; 235/482, 486

[56] References Cited

U.S. PATENT DOCUMENTS

| | | | |
|---|---|---|---|
| 2,641,659 | 6/1953 | Benson | 379/445 |
| 4,396,810 | 8/1983 | Cover | 379/445 |
| 4,672,661 | 6/1987 | Clark, Jr. et al. | 379/144 |
| 4,798,945 | 1/1989 | Bruckner et al. | 235/479 |
| 4,807,059 | 2/1989 | Talmadge et al. | 360/60 |
| 4,811,387 | 3/1989 | Hollewed et al. | 379/144 |
| 4,837,814 | 6/1989 | Yoshino et al. | 379/144 |

*Primary Examiner*—Stafford D. Schreyer
*Attorney, Agent, or Firm*—Davis Hoxie Faithful & Hapgood

[57] ABSTRACT

A telephone set having a base unit and a handset which is removable from a rest position on the base unit to make a telephone call and replaceable in the rest position following the call, and means for receiving a telephone enabling element which must be inserted into the receiving means to enable a call to be made and should be removed from the receiving means on completion of the call, characterized by means for ensuring that replacement of the handset in the rest position is obstructed when the telephone enabling element is present in the receiving means.

2 Claims, 1 Drawing Sheet

U.S. Patent   Jul. 31, 1990   4,945,558

TELEPHONE SET

This invention relates to telephone sets having a base unit and a handset which is removable from a rest position on the base unit to make a telephone call and replaceable in the rest position following the call.

In particular, the invention is concerned with such telephone sets which also have means for receiving a payment card or comparable telephone enabling element which must be inserted into the receiving means to enable a call to be made and should be removed from the receiving means on completion of the call.

It has been found that for various reasons, such as the telephone user being in a hurry, the payment card is frequently left in the receiving means of the base unit after the user has completed a call. Then, not only is it lost to the user, but it may be used fraudulently by anyone else who finds it, whether for making further telephone calls or, in the case of a multi-use credit card, for the purpose of purchasing other goods or services.

The present invention aims to overcome this problem.

In accordance with the invention, a telephone set of the kind described above is characterised by means for ensuring that replacement of the handset in the rest position is obstructed when the telephone enabling element is present in the receiving means.

Thus, the user will either find it unusually difficult, or impossible, to replace the handset in the rest position if he has not previously removed his telephone enabling element from the receiving means and so he is automatically reminded that he has failed to do this. Once he removes the enabling element, the handset can be replaced in the usual way.

Figure 2:
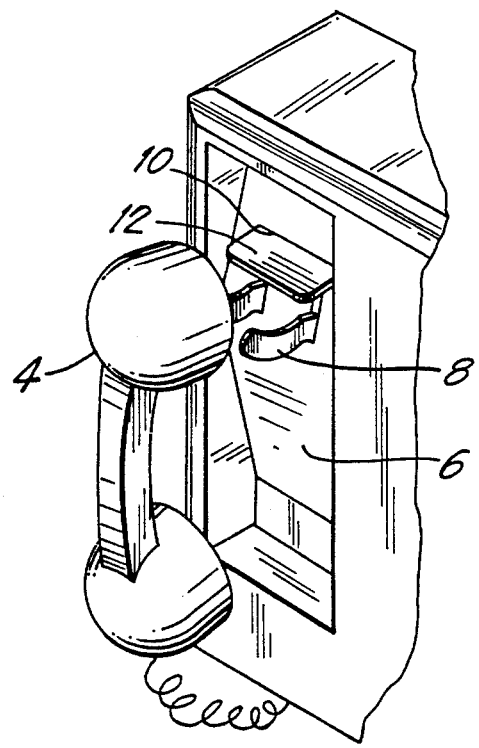

In order that the invention may be more clearly understood, an embodiment thereof will now be described, by way of example, with reference to the accompanying diagrammatic drawings, in which FIG. 1 shows an elevation of a telephone set incorporating the invention; and FIG. 2 shows a partial perspective view of the same telephone set.

The base unit 2 is of the wall-mounting type and a rest position is defined for the handset 4 by a recess 6 in the front of the base unit and a hook switch 8 on which the handset 4 can hang in its rest position, partly within the recess 6, by its earpiece The base unit 2 will include all the facilities necessary for the telephone set to be operated to make telephone calls by a user, which need not in themselves be described because they form no part of the present invention. It also, as is known, includes a receiving means in the form of a slot 10 for receiving a telephone enabling element in the form of a payment card 12, and a facility for ensuring that the telephone cannot be used to make a call unless a valid card 12 is inserted into slot 10.

It can be seen from FIGS. 1 and 2 that the slot 10 is located and arranged so that when the card 12 is present in it, the free end of the card is protruding sufficiently, just above the hook 8, to obstruct replacement of the handset 4 on the hook 8. The obstruction may be complete so that the handset cannot be hung on the hook at all, or it may only be partial so that the user attempting to hang the handset on the hook will realise that it is very insecure. In any event, he will be reminded by this obstructed access that he should remove his card 12 in order to be able to replace the handset, or replace it securely Hence, he will not leave card 12 in the slot after completing his phone call thus avoiding the problem referred to above Although the telephone enabling element has been shown in the form of a payment card, it will be apparent that the invention does not rely upon its having the form of a card. It could in principle be of a different configuration. Also, the enabling element need not necessarily be for ensuring that payment is made for the call. It could be purely a security device designed to ensure that only the possessor of that security device is able to use a particular telephone.

In a different embodiment of the invention, the card slot 10 would be located alongside the rest position of the handset, as is already known, and a sensor would be provided, possibly in the form of a simple switch, responsive to the presence of the card 12 in the slot. Closure of the switch in response to insertion of the card would activate a relay which in turn would drive a specially provided obstructing element located for example in the same position as card 12 in FIGS. 1 and 2 into a protruding position where it would obstruct replacement of the handset. Withdrawal of the card would open the switch, the obstructing element would then be withdrawn upon de-energisation of the relay, and the handset could be replaced.

In a further embodiment, a similar electromechanical system may be employed to lock the hook 8 in its raised, "off-hook", position. With the hook locked in this position the handset is difficult to replace in its rest position partly in recess 6, and so again the user receives the desired reminder until he removes his card.

It should also be mentioned that the embodiment of FIGS. 1 and 2 ensures that the handset is taken off the hook before the payment card is inserted into the slot to make a call, which forces the user to adopt this sequence of events, this being an advantage in cases where the telephone set is designed to operate only when that sequence of events is observed.

I claim:

1. A telephone set having a base unit and a handset which is removable from a rest position on the base unit to make a telephone call and replaceable in the rest position following the call, and means for receiving a telephone enabling element which must be inserted into the receiving means to enable a call to be made and should be removed from the receiving means on completion of the call, characterized by means for defining a second, unstable or insecure position for the handset on the base unit, said means being operative when the telephone enabling element is present in the receiving means.

2. A telephone set as claimed in claim 1, wherein said means for defining a second unstable or insecure position for the handset on the base unit comprises the receiving means being located and arranged so that when the telephone enabling element is present therein the enabling element obstructs replacement of the handset in the rest position.

* * * * *